United States Patent
Murai

(10) Patent No.: US 8,457,583 B2
(45) Date of Patent: Jun. 4, 2013

(54) WIRELESS COMMUNICATION DEVICE, WIRELESS COMMUNICATION METHOD, AND WIRELESS COMMUNICATION SYSTEM

(75) Inventor: Takayuki Murai, Tokyo (JP)

(73) Assignee: NEC Corporation, Tokyo (JP)

( * ) Notice: Subject to any disclaimer, the term of this patent is extended or adjusted under 35 U.S.C. 154(b) by 123 days.

(21) Appl. No.: 13/148,900

(22) PCT Filed: Jan. 20, 2010

(86) PCT No.: PCT/JP2010/000298
§ 371 (c)(1),
(2), (4) Date: Aug. 10, 2011

(87) PCT Pub. No.: WO2010/095350
PCT Pub. Date: Aug. 26, 2010

(65) Prior Publication Data
US 2011/0319026 A1    Dec. 29, 2011

(30) Foreign Application Priority Data

Feb. 19, 2009   (JP) ................................ 2009-035988

(51) Int. Cl.
*H04B 7/00* (2006.01)
(52) U.S. Cl.
USPC ................. 455/277.1; 455/63.1; 455/277.2; 455/561; 455/562.1; 455/101
(58) Field of Classification Search
USPC .................. 455/63.1, 277.1, 277.2, 561, 562, 455/101, 102; 375/132
See application file for complete search history.

(56) References Cited

U.S. PATENT DOCUMENTS

| | | | |
|---|---|---|---|
| 6,212,242 B1* | 4/2001 | Smith et al. ................... | 375/299 |
| 6,385,464 B1* | 5/2002 | Narita et al. .................. | 455/561 |
| 6,396,821 B1* | 5/2002 | Takahashi ..................... | 370/335 |
| 6,430,404 B1* | 8/2002 | Lindenmeier et al. ........ | 455/132 |
| 7,035,612 B2* | 4/2006 | Kishimoto et al. ......... | 455/277.1 |
| 2006/0025097 A1* | 2/2006 | Zahm ......................... | 455/277.1 |

FOREIGN PATENT DOCUMENTS

| JP | 55-97746 A | 7/1980 |
|---|---|---|
| JP | 9-191234 A | 7/1997 |
| JP | 9-307490 A | 11/1997 |
| JP | 2000269830 A | 9/2000 |
| JP | 2002077094 A | 3/2002 |
| JP | 2005277910 A | 10/2005 |

OTHER PUBLICATIONS

International Search Report for PCT/JP2010/000298 mailed Mar. 16, 2010.

* cited by examiner

*Primary Examiner* — Sanh Phu

(57) ABSTRACT

By switching to a method that allocates frequency diversity as an independent signal sequence during the time when an influence of fading is small, adaptively corresponding to an increase and decrease of fading, performs stable wireless communication, and frequency resources are effectively utilized. A wireless communication system selects and performs quadruple diversity which is composed of space diversity using two uncorrelated antennas and frequency diversity using two waves of frequencies f1 and f2 or double diversity of only the space diversity. A matching filter 211 evaluates that the influence of fading is small when all tap information from adaptive matched filters 207 to 210 indicates a value greater than or equal to a threshold, and while switching selector switches 104 and 215 and performing only the space diversity, transmitting and receiving independent two transmission data that is respectively modulated by modulators 102 and 103.

6 Claims, 4 Drawing Sheets

WIRELESS COMMUNICATION DEVICE, WIRELESS COMMUNICATION METHOD, AND WIRELESS COMMUNICATION SYSTEM

TECHNICAL FIELD

The present invention relates to a wireless communication device, a wireless communication method, and a wireless communication system, and particularly to a wireless communication device, a wireless communication method, and a wireless communication system that are provided with frequency diversity and space diversity and perform diversity transmission and reception.

BACKGROUND ART

A wireless communication system which is provided with frequency diversity and space diversity and performs diversity transmission and reception is known (for example, see Patent Literature 1 and Patent Literature 2). Patent Literature 1 discloses a configuration in which, in a wireless communication system that is provided with the frequency diversity and the space diversity, when a receiving side evaluates that the status (line quality) of radio wave propagation is favorable based on a received electric field, a diversity operation is suspended, frequency bands are efficiently used, and the amount of data is doubled.

Further, Patent Literature 2 discloses a wireless communication device with a configuration in which, on the receiving side that receives wireless signals modulated to at least two frequencies which are different from each other and realizes the frequency diversity and the space diversity, the same number of pairs of receivers as the number of frequency are included corresponding to each frequency, reception levels of all the receivers are compared and the receiver with the greatest reception level is selected, and furthermore the receiver with the greatest reception level among the plurality of receivers which receive the same reception frequency as the receiver is selected.

CITATION LIST

Patent Literature

Patent Literature 1

Japanese Unexamined Patent Application Publication No. 2005-277910

Patent Literature 2

Japanese Unexamined Patent Application Publication No. 9-307490

SUMMARY OF INVENTION

Technical Problem

However, in a wireless communication system and a wireless communication device provided with the frequency diversity and the space diversity which are'disclosed in Patent Literature 1 and 2, a diversity order is determined so as to maintain the line quality at the time when fading is the most severest, however as there is fluctuation in the short cycle and long cycle (seasonal unit or the like) in the fading, the determined diversity order may be excessive during the time when the influence of fading is small.

Further, Patent Literature 2 discloses a wireless communication system that efficiently uses frequency bands, and doubles the amount of data when the radio wave propagation characteristics are favorable, however when the radio wave propagation characteristics are favorable, the diversity operation is suspended, thus it is necessary to repeat suspending and resuming the diversity operation for the fading that fluctuates in the short cycle, and there is a possibility that stable communication cannot be performed.

The present invention is made in light of the above points, and aims to provide a wireless communication device, a wireless communication method, and a wireless communication system that, by switching to a method to allocate the frequency diversity as an independent signal sequence during the time when the influence of fading is small, adaptively correspond to an increase and decrease of fading to perform stable wireless communication, and effectively utilizes frequency resources.

Solution to Problem

In order to achieve the abovementioned purpose, a wireless communication device according to the present invention includes a first wireless communication means by frequency diversity, a second wireless communication means by space diversity, a monitoring means that monitors radio propagation status and evaluates whether an influence of fading is large or not according to a reception signal, and a switching means that performs wireless communication by quadruple diversity which transmits and receives one transmission data by the first and the second wireless communications means in a period which is evaluated by the monitoring means that the influence of fading is large and performs wireless communication by double diversity which transmits and receives plurality of transmission data separately by the second wireless in a period which is evaluated by the monitoring means that the influence of the fading is small.

Further, in order to achieve the abovementioned purpose, a wireless communication method according to the present invention includes performing first wireless communication by frequency diversity, performing second wireless communication by space diversity, monitoring radio propagation status and evaluating whether an influence of fading is large or not according to a reception signal, performing wireless communication by quadruple diversity which transmits and receives one transmission data by the first and the second wireless communications means in a period which is evaluated by the monitoring that the influence of fading is large and performing wireless communication by double diversity which transmits and receives plurality of transmission data separately by the second wireless communication means in a period which is evaluated by the monitoring that the influence of the fading is small.

Furthermore, in order to achieve the abovementioned purpose, a wireless communication system according to the present invention for performing wireless communication between opposing wireless communication devices, in which each of the opposing wireless communication devices includes a first wireless communication means by frequency diversity, a second wireless communication means by space diversity, a monitoring means that monitors radio propagation status and evaluates whether an influence of fading is large or not according to a reception signal, and a switching means that performs wireless communication by quadruple diversity which transmits and receives one transmission data by the first and the second wireless communications means in a period which is evaluated by the monitoring means that the influence of fading is large and performs wireless communication by double diversity which transmits and receives plurality of transmission data separately by the second wireless communication means in a period which is evaluated by the monitoring means that the influence of the fading is small.

Advantageous Effects of Invention

According to the present invention, when performing wireless communication by the frequency diversity and the space diversity, in the period when the influence of fading is large, the state is maintained in which the communication by both the frequency diversity and the space diversity is possible, and in the period when the influence of fading is small, while maintaining the state in which the communication only by the space diversity is possible, by increasing communication capacity for the amount not performing the frequency diversity, the frequency resources are effectively utilized, so that efficient communication can be stably performed.

DESCRIPTION OF EMBODIMENTS

Next, exemplary embodiments of the present invention are described with reference to the drawings.

Figure 1:
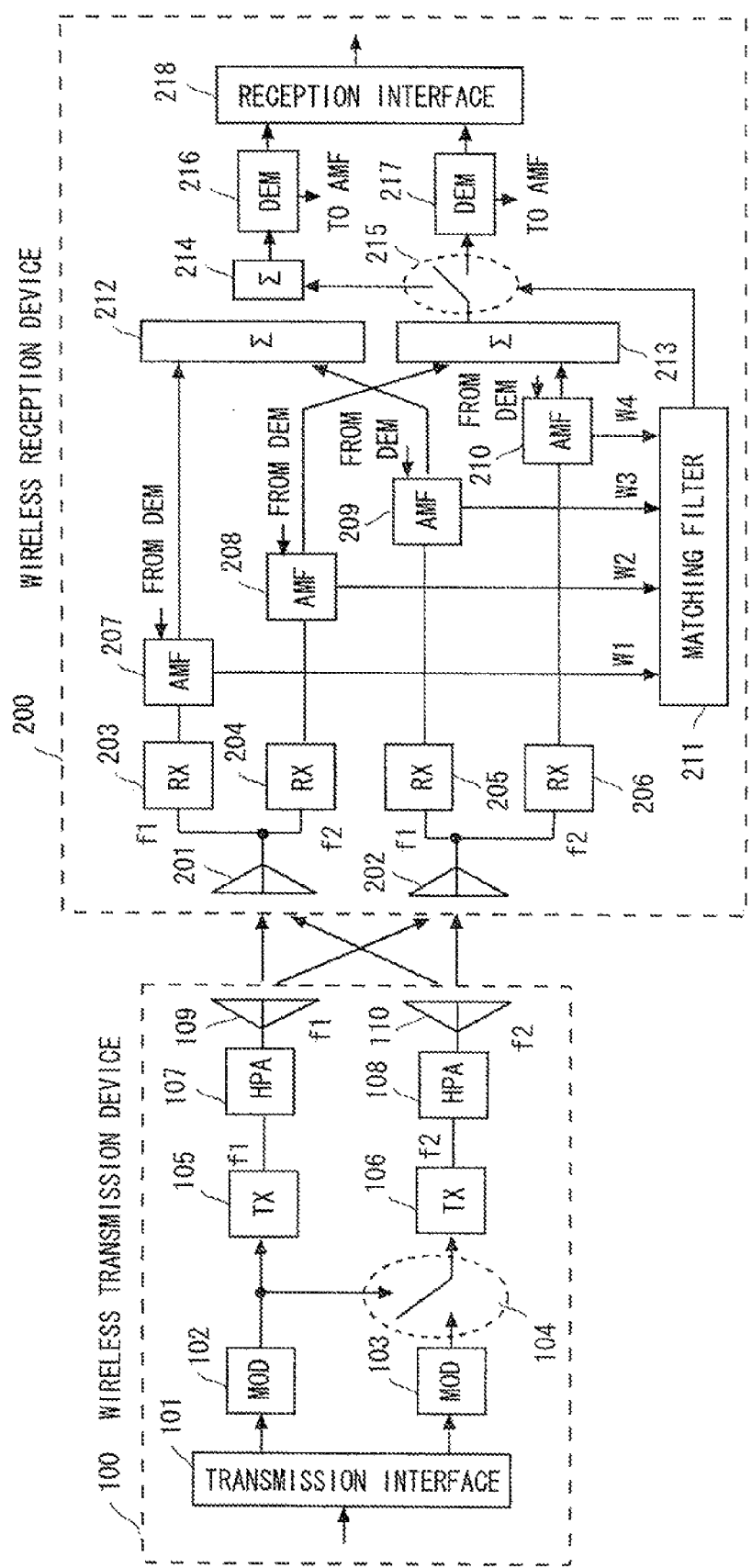
FIG. 1 is a block diagram of one embodiment of a wireless communication device, a wireless communication method, and a wireless communication system according to the present invention.

FIG. 1 shows a block diagram of one embodiment of a wireless communication device, a wireless communication system, and a wireless communication system according to the present invention. The wireless communication system of this exemplary embodiment is composed of two opposing wireless communication devices, and for convenience, FIG. 1 shows a wireless transmission device 100 in one of the wireless communication device and a wireless reception device 200 in the other wireless communication device. In one of the wireless communication device, a wireless reception device with the same configuration as the wireless reception device 200 is provided, and similarly in the other wireless communication device, a wireless transmission device with the same configuration as the wireless communication device 100 is provided.

The wireless transmission device and the wireless reception device in the same wireless communication device may be connected to a circulator for separating transmission and reception, and two antennas 109 and 110, and 201 and 202 may be shared for transmission and reception. The wireless communication system of this exemplary embodiment is a configuration example that selects and performs quadruple diversity composed of space diversity using two uncorrelated antennas and frequency diversity using two waves of frequencies f1 and f2, or double diversity composed of only the space diversity.

The wireless transmission device 100 includes a transmission interface 101, modulators (MOD:Modulator) 102 and 103, a selector switch 104, and transmitters (TX) 105 and 106, power amplifiers (HPA:High Power Amplifier) 107 and 108, and antennas (antennas) 109 and 110. The selector switch 104 selects one of each output signal of the modulators 102 and 103, and inputs it into the transmitter 106.

On the other hand, the wireless reception device 200 includes antennas (antennas) 201 and 202, receivers (RX) 203 to 205, adaptive matched filters (AMF:Adaptive Matched Filter) 207 to 210, a matching filter 211, adders 212 to 214, a selector switch 215, demodulators (DEM:Demodulator) 216 and 217, and a reception interface 218. The adder 212 adds signals output from the adaptive matched filters 207 and 209. The adder 213 adds signals output from the adaptive matched filters 208 and 210. The selector switch 215 outputs the signal output from the adder 213 to the adder 214 or the demodulator 217.

The adaptive matched filters 207 to 210 are known adaptive filters which respectively estimate a time-varying transmission path impulse, convolve time-reversal complex conjugate of its impulse response with a reception signal, and perform S/N maximum ratio combining, and are usually considered as the configuration of the transversal filter.

Figure 2:
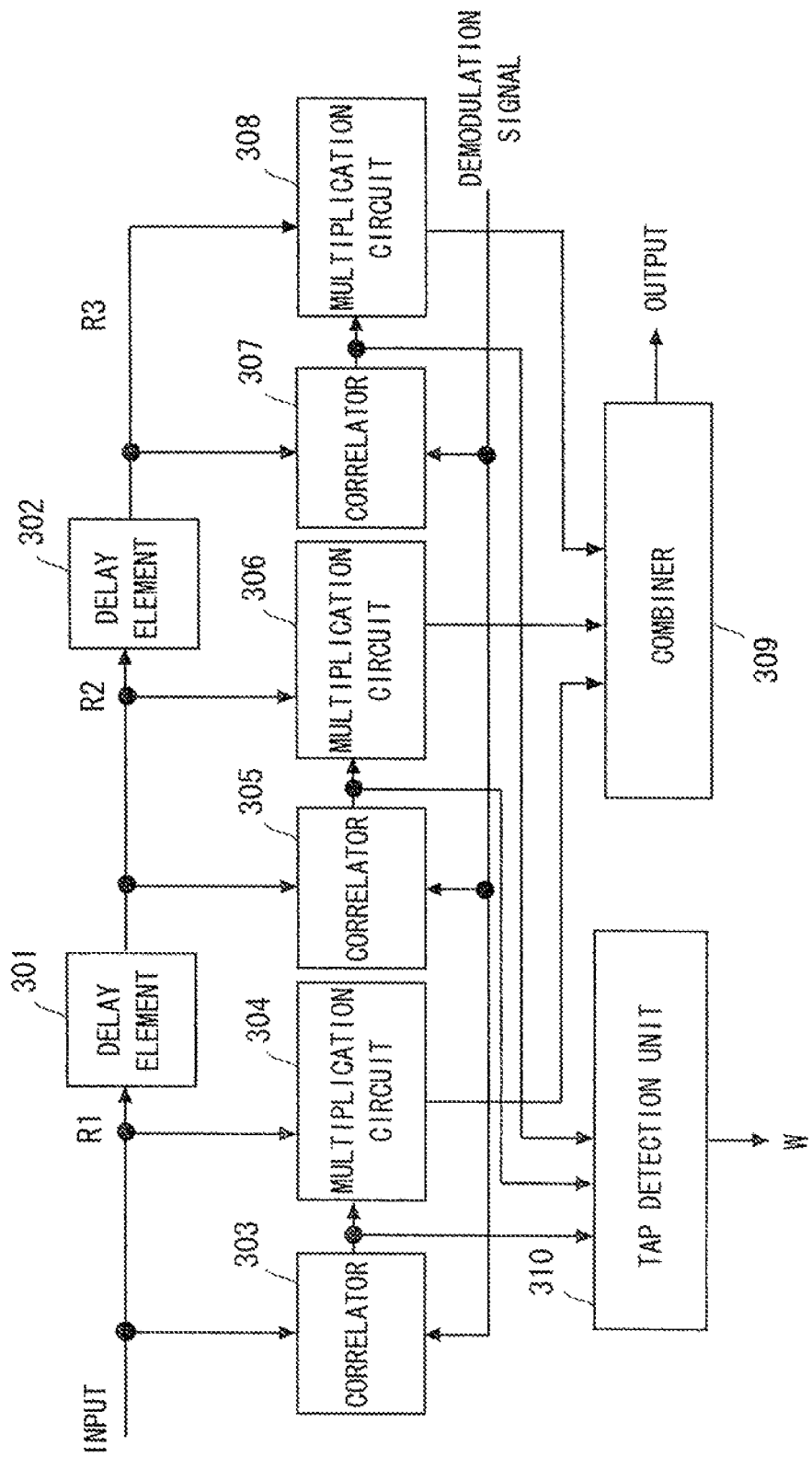
FIG. 2 is block diagram of an example of an adaptive matched filter.

FIG. 2 shows a block diagram of an example of the adaptive matched filter. As shown in the drawing, the adaptive matched filter has a configuration including delay elements 301 and 302 which respectively delay an input signal by time τ and are cascaded, correlators 303, 305, and 307 which calculate correlation between a signal at each tap (R1, R2, and R3) and a demodulation signal, and outputs them as tap coefficients (wa, wb, and wc), multiplication circuits 304, 306, and 308 which multiply the signal at each tap and the tap coefficient, a combiner 309 which combines each output signal of the multiplication circuits 304, 306, and 308, and a tap detection unit 310.

The time delay τ of the delay elements 301 and 302 is set to ½ of a symbol period T, for example. The correlators 303, 305, and 307 respectively perform correlation operation between the signal at each tap R1, R2, and R2 and the demodulation signal demodulated by the demodulators 216 and 217, and supply their operation results to the multiplication circuits 304, 306, and 308 as the tap coefficients wa, wb, and wc. When the values of the tap coefficients wa, wb, and wc are large, it indicates that the correlation with the demodulation signal is high.

Note that in FIG. 1, the demodulation signal from the demodulator 216 is input to the adaptive matched filters 207 and 209, to which a signal obtained by converting the reception signal of the frequency f1 into a predetermined frequency is input, and the demodulation signal from the demodulator 217 is input to the adaptive matched filters 208 and 210, to which a signal obtained by converting the reception signal of the frequency f2 into a predetermined frequency is input. However, the demodulation signal from the demodulator 216 is input to all the adaptive matched filters 207 to 210 at the time of operation of the quadruple diversity described later.

The multiplication circuits 304, 306, and 308 multiply the signal at each tap R1, R2, and R2 respectively by the tap coefficients wa, wb, and wc, and generate signals made by weighting the tap coefficients wa, wb, and wc on the signal at each tap R1, R2, and R3. The combiner 309 combines the signal output from the multiplication circuits 304, 306 and 308, and outputs it to the subsequent stage of the adder 212 or 213. Further, the tap detection unit 310 compares the tap coefficients wa, wb, and wc, and outputs, for example, the maximum tap coefficient to the matching filter 211 of FIG. 1 as tap information W.

Next, an operation of this exemplary embodiment shown in FIG. 1 is explained. The transmission interface 101 supplies the input transmission data respectively to the modulators 102 and 103. The modulator 102 modulates input first transmission data by the predetermined modulation technique, and supplies the obtained first modulated signal to the transmitter 105 and a first input terminal of the selector switch 104. The modulator 103 modulates input second transmission data by the same predetermined modulation technique as the modulator 102, and supplies the obtained second modulated signal to the transmitter 104 and a second input terminal of the selector switch 104.

The selector switch 104 is switched according to whether the fading is large or not, selects the first modulated signal or the second modulated signal, and supplies it to the transmitter 106. The transmitter 105 frequency-converts the input first modulated signal into a first transmission signal having the frequency f1 within a high frequency band such as a microwave band, and supplies the generated first transmission signal to the power amplifier 107. On the other hand, the transmitter 106 frequency-converts the input first or the second modulated signal into a second transmission signal having the frequency f2 within a high frequency band such as a microwave band, and supplies the generated second transmission signal to the power amplifier 108.

The power amplifier 107 amplifies the power of the input first transmission signal to a required level, and then transmits it to space from the antenna 109. Similarly, the power amplifier 108 amplifies the power of the input second signal to the required level, and then transmits it to space from the antenna 120. The transmission signals of two waves transmitted from the antennas 109 and 110, respectively propagate two different propagation paths, and received by two antennas 201 and 202 of the wireless reception device, which are placed to be spatially uncorrelated.

The signal received by the antenna 201 is split into the frequencies f1 and f2, the reception signal of the frequency f1 is supplied to the receiver 203, and the reception signal of the frequency f2 is supplied to the receiver 204. Similarly, the signal received by the antenna 202 is split into the frequencies f1 and f2, the reception signal of the frequency f1 is supplied to the receiver 205, and the reception signal of the frequency f2 is supplied to the receiver 206.

While respectively amplifying the input reception signal, the receivers 203, 204, 205, and 206 frequency-convert the reception signals into signals of the same predetermined frequency band (for example, an intermediate frequency signal of an intermediate frequency band), and then supply them to the adaptive matching filters 207, 208, 209, and 210 which are provided correspondingly. While respectively performing S/N maximum ratio combining to the input signals by the known adaptive matching filtering process, which is explained along with FIG. 2, the adaptive matched filters 207, 208, 209, and 210 supply tap information W1, W2, W3, and W4, which is maximum values of the tap coefficients among the used tap coefficients to the matching filter 211.

The adder 212 adds the signals which are obtained by performing the S/N maximum ratio combining by the adaptive matching filter 207 and 209 to the reception signals of the same frequency f1, which are received by different antennas 201 and 202. Further, the adder 213 adds the signals which are obtained by performing the S/N maximum ratio combining by the adaptive matching filter 208 and 210 to the reception signals of the same frequency f2, which are received by different antennas 201 and 202.

The adder 214 outputs only a first addition signal output from the adder 212, or when the second addition signal from the adder 213 is input via the selector switch 215, generates and outputs a third addition signal, which is obtained by adding a second addition signal to the first addition signal.

While demodulating the first addition signal or the third addition signal supplied from the adder 214 and supplying the demodulation signal to the reception interface 218, the demodulator 216 supplies it to the adaptive matching filters 207 and 209 or the adaptive matching filters 207 to 210. While demodulating the second addition signal input via the selector switch 215 and supplying the demodulation signal to the reception interface 218, the demodulator 217 supplies it to the adaptive matching filters 208 and 210. The reception interface 218 receives the first demodulation signal output from the demodulator 216, and the second demodulation signal output from the demodulator 217 as input signals, and combines and outputs them. Note that when only the first demodulation signal is input, the reception interface 218 outputs only the first demodulation signal.

Here, in this exemplary embodiment, switching the diversity order is automatically performed by monitoring radio propagation status. Specifically, in this exemplary embodiment, the tap information W1 to W4 input from the adaptive matched filters 207 to 210 is monitored by the matching filter 211, whether the influence of fading is small or not is evaluated according to whether the tap information W1 to W4 is greater than or equal to a previously specified predetermined threshold or not, and an operation is performed by the quadruple diversity or double diversity.

Firstly, in the period which is evaluated that the value of one or more tap information among four pieces of the tap information W1 to W4, which are input from the AMPs 207 to 210, indicates a value less than the previously specified predetermined threshold by the matching filter 211, it is evaluated that the influence of fading is large, and the matching filter 211 controls the selector switch 215 to supply the second addition signal from the adder 213 to the adder 214.

Similarly, the wireless reception device with the same configuration as the wireless reception device 200 which is not shown and provided in the same wireless communication device as the wireless transmission device 100 receives two waves of transmission signals of frequencies f3 and f4 from the wireless transmission device with the same configuration as the wireless transmission device 100 provided in the same wireless communication device as the wireless reception device 200, and by the similar operation as the wireless reception device 200, when evaluating that it is the period when the influence of fading is large, controls the selector switch 104 to supply the first modulated signal from the modulator 102 to the transmitter 106.

Figure 3:
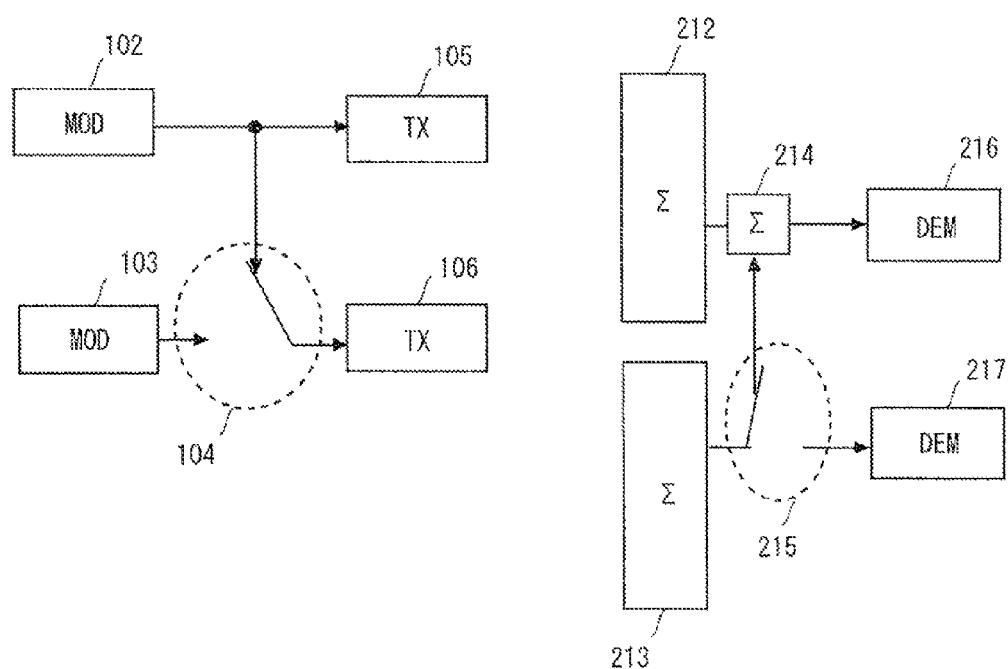
FIG. 3 is a block diagram of an important part of the wireless communication system of FIG. 1 in a period when the influence of fading is large.

Accordingly, when it is evaluated that is the period when the influence of fading is large, as shown in FIG. 3, since in the wireless transmission device 100, the first modulated signal from the modulator 102 to be supplied to the transmitter 105 is selected by the selector switch 104 and supplied also to the transmitter 106, the modulator 103 will not be used. Moreover, in the wireless reception device 200, as shown in FIG. 3, the second addition signal from the adder 213 is selected by the selector switch 215 and supplied to the adder 214, thus the demodulator 217 will not be used. Therefore, when it is evaluated that it is the period when the influence of fading is large, communication by the quadruple diversity is performed to maintain line quality.

In this case, in the wireless transmission device 100, the transmission interface 101 supplies transmission data which should be transmitted only to the modulator 102. The modulated signals, which are the transmission data output from the modulator 201 and modulated, are respectively amplified and frequency-converted into the transmission signals of the wireless frequencies f1 and f2 by the transmitters 105 and 106. Then, the transmission signals are transmitted from the antennas 109 and 110 via the power amplifiers 107 and 108. The transmission signals of these two waves respectively propagate two different propagation paths, and are received by the antennas 201 and 202 of the wireless reception device 200.

In the wireless reception device 200, as mentioned above, the reception signals of the frequency f1 received by the antennas 201 and 202 are supplied to the adder 212 via the receivers 203 and 205 and the adaptive matched filters 207 and 209, and will be the first addition signal of the predetermined frequency band. Further, the reception signal of the frequency f2 is supplied to the adder 213 via the receivers 204 and 206 and the adaptive matched filters 208 and 210, and will be the second addition signal of the same predetermined frequency band as above.

As shown in FIG. 3, after these first and second addition signals are added by the adder 214 to be the third addition signal, it is supplied to the demodulator 216. The third addition signal is a signal generated from two waves of the reception signals received by the antenna 201 and two waves of the reception signals received by the antenna 202, and is a signal made by diversity combining four waves of the reception signals. The demodulator 216 demodulates the third addition signal, which is a signal made by diversity combining these four waves of the reception signals. When it is evaluated that the influence of fading is large in this way, communication by the quadruple diversity is performed in order to maintain the line quality.

On the other hand, in the period when all the values of four pieces of the tap information W1 to W4 that are input from the adaptive matching filters 207 to 210 indicates greater than or equal to a previously specified predetermined threshold, it is evaluated that the influence of fading is small by the matching filter 211, and the matching filter 211 controls the selector switch 215 to supply the second addition signal from the adder 213 to supply to the demodulator 217.

Similarly, the wireless reception device with the same configuration as the wireless reception device 200 which is not shown and provided in the same wireless communication device as the wireless transmission device 100 receives two waves of the transmission signals of the frequencies f3 and f4 from the wireless transmission device with the same configuration as the wireless transmission device 100 provided in the same wireless communication device as the wireless reception device 200, and by the similar operation as the wireless reception device 200, when evaluating that it is the period when the influence of fading is small, controls the selector switch 104 to supply the second modulated signal from the modulator 103 to the transmitter 106.

Figure 4:
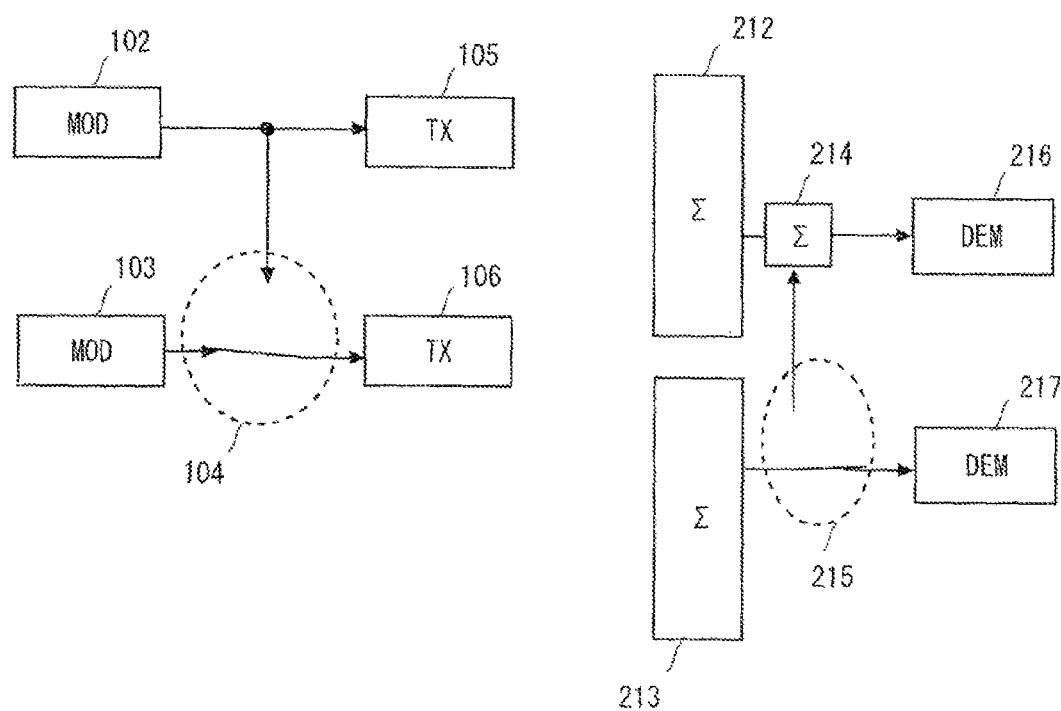
FIG. 4 is a block diagram of the important part of the wireless communication system of FIG. 1 in a period when the influence of fading is small.

Accordingly, when it is evaluated that it is the period when the influence of fading is small, as shown in FIG. 4, in the wireless transmission device 100, the second modulated signal from the modulator 103 is selected by the selector switch 104 and supplied to the transmitter 106. Further, in the wireless reception device 200, as shown in FIG. 4, the second addition signal from the adder 213 is selected by the selector switch 215 and supplied to the demodulator 217, and the addition operation in the adder 214 will not be performed. Therefore, when evaluating that it is the period when the influence of fading is small, it is evaluated that it is the period when there is no influence of the line quality even when the diversity order is reduced, and communication by the double diversity is performed. At this time, the two waves of frequencies are used for transmission of separate data, and the transmission capacity is doubled.

In this case, in the wireless transmission device 100, the transmission interface 101 supplies the first transmission data, which is to be transmitted, to the modulator 102, and supplies the second transmission data, which is to be transmitted, to the modulator 103. The first and second modulated signals, which are output from the modulators 102 and 103 and modulated, are respectively amplified and frequency-converted into the transmission signals of the wireless frequencies f1 and f2 by the transmitters 105 and 106. Then, the transmission signals are transmitted to space from the antennas 109 and 110 via the power amplifiers 107 and 108. The transmission signals of these two waves respectively propagate two different propagation paths, and are received by the antennas 201 and 202 of the wireless reception device 200.

In the wireless reception device 200, as mentioned above, the reception signal of the frequency f1 received by the antennas 201 and 202 is supplied to the adder 212 via the receivers 203 and 205 and the adaptive matched filters 207 and 209, and will be the first addition signal of the predetermined frequency band. Further, the reception signal of the frequency f2 is supplied to the adder 213 via the receivers 204 and 206 and the adaptive matched filters 208 and 210, and will be the second addition signal of the same predetermined frequency band as above.

Among these first and second addition signals, as shown in FIG. 4, the first addition signal is supplied to the demodulator 216 via the adder 214, and the first transmission data is demodulated. As shown in FIG. 4, the second addition signal is supplied to the demodulator 217 by the selector switch 215, and the second transmission data is demodulated.

As described above, when evaluating that it is the period when the influence of fading is small, according to the wireless communication system of this exemplary embodiment, double diversity communication is performed by separate space diversity in two paths between the modulator 102 and the demodulator 216, and between the modulator 103 and the demodulator 217, thus the transmission capacity can be doubled than at the time of the quadruple diversity communication.

Although the present invention is explained with reference to the exemplary embodiments, the present invention is not limited by above. Various modification understood by a person skilled in the art within the scope of the invention can be made to the configuration and details of the present invention.

The present application claims priority rights of and is based on Japanese Patent Application No. 2009-035988 filed on Feb. 19, 2009 in the Japanese Patent Office, the entire contents of which are hereby incorporated by reference.

REFERENCE SIGNS LIST

100 WIRELESS TRANSMISSION DEVICE
101 TRANSMISSION INTERFACE
102 and 103 MODULATOR (MOD)
104 and 215 SELECTOR SWITCH
105 and 106 TRANSMITTER (TX)
107 and 108 POWER AMPLIFIER (NPA)
109, 110, 201, and 202 ANTENNA
200 WIRELESS RECEPTION DEVICE
203 to 206 RECEIVER (RX)
207 to 210 ADAPTIVE MATCHED FILTER (AMF)

211 MATCHING FILTER
212 to 214 ADDER
216 and 217 DEMODULATOR (DEM)
218 RECEPTION INTERFACE
301 and 302 DELAY ELEMENT
303, 305, and 307 CORRELATOR
304, 306, and 308 MULTIPLICATION CIRCUIT
309 COMBINER
310 TAP DETECTION UNIT

The invention claimed is:

1. A wireless communication device comprising:
a first wireless communication unit by frequency diversity;
a second wireless communication unit by space diversity;
a monitoring unit that monitors radio propagation status and evaluates whether an influence of fading is large or not according to a reception signal; and
a switching unit that performs wireless communication by quadruple diversity in a period which is evaluated by the monitoring unit that the influence of fading is large and performs wireless communication by double diversity in a period which is evaluated by the monitoring unit that the influence of the fading is small; the quadruple diversity transmitting and receiving one transmission data by the first and the second wireless communications units, and the double diversity transmitting and receiving plurality of transmission data separately by the second wireless communication unit.

2. A wireless communication device comprising:
a transmitting device including
a plurality of modulation units that respectively modulate transmission data,
a transmission signal generation unit that converts the input modulated transmission data into a plurality of transmission signals of transmission frequencies which are different from each other,
a first switching unit that selects the plurality of modulated transmission data which is respectively output from the plurality of modulation units or the modulated transmission data which is output from the predetermined one modulation unit among the plurality of modulation units and supplies it to the transmission signal generation unit, and
a plurality of antennas for transmission that respectively and separately transmit the plurality of transmission signals to space; and
a receiving device including
a reception unit that receives the plurality of transmission signals by a plurality of antennas for reception which are placed to be spatially uncorrelated, and splits the reception signal into different frequencies,
a converted reception signal generation unit that converts each of the reception signal split into different frequencies separately into a signal of a same predetermined frequency band and outputs the plurality of converted reception signals,
a monitoring unit that monitors radio propagation status according to the plurality of reception signals and evaluates whether the influence of fading is large or small,
a combining unit that adds the converted reception signals to each other which have a same frequency before conversion among the plurality of converted reception signals and generates a plurality of first addition signals;
a plurality of demodulation units, and
a second switching unit that selects the plurality of first addition signals so as to demodulate the plurality of first addition signals respectively by the plurality of demodulation units, or so as to demodulate a second addition signal by the predetermined one demodulation unit by adding the plurality of first addition signals and generating the second addition signal,
wherein in a period which is evaluated by the monitoring unit that the influence of fading is large, while the modulated transmission data output from the predetermined one modulation unit among the plurality of modulation units is selected by the first switching unit and supplied to the transmission signal generation unit, the plurality of first addition signals are selected by the second switching unit so as to demodulate the second addition signal by the predetermined one demodulation unit, and in a period which is evaluated by the monitoring means that the influence of fading is small, while the plurality of modulated transmission data respectively output from the plurality of modulation units is selected by the first switching unit and supplied to the transmission signal generation unit, the plurality of first addition signals are respectively demodulated by the plurality of demodulation units by the second switching units.

3. The wireless communication device according to claim 2, wherein the monitoring unit is composed of
a plurality of adaptive matching filter units that perform S/N maximum ratio combining separately to the plurality of reception signals, and
a matching filter unit that monitors radio propagation status according to plurality of tap information output from the plurality of adaptive matching filter units, evaluates that the influence of fading is small when all the plurality of tap information indicates a value greater than or equal to a predetermined threshold, and evaluates that the influence of fading is large when one or more of the plurality of tap information indicates a value less than the threshold.

4. The wireless communication device according to claim 2, wherein the second switching unit is composed of
an adder that passes the predetermined one first addition signal as is among the plurality of first addition signals, or adds the predetermined one first addition signal and a first addition signal other than the predetermined one addition signal and thereby generates the second addition signal, and
a selector switch that selects and supplies the first addition signal other than the predetermined one first addition signal to the adder or the demodulation unit that respectively demodulates the first addition signal other than the predetermined one first addition signal.

5. A wireless communication method comprising:
respectively modulating transmission data and generating plurality of modulated transmission data;
selecting the plurality of modulated transmission data or the predetermined one modulated transmission data among the plurality of modulated transmission data;
converting the selected modulated transmission data into a plurality of transmission signals with transmission frequencies which are different from each other;
separately transmitting the plurality of transmission signals respectively using a plurality of antennas for transmission;
receiving the plurality of transmission signals by a plurality of antennas for reception which are placed to be spatially uncorrelated and splitting the reception signal into different frequencies;
converting each of the reception signal split into different frequencies separately into a signal of a same predetermined frequency band and outputting the plurality of converted reception signals;

monitoring radio propagation status and evaluating whether the influence of fading is large or small according to the plurality of reception signals; and adding the converted reception signals which have a same frequency before conversion among the plurality of converted reception signals and generating a plurality of first addition signals, wherein in a period which is evaluated by the monitoring that the influence of fading is large, while the predetermined converted one transmission data is selected, the second addition signal obtained by adding the plurality of first addition signals is demodulated by predetermined one demodulation unit, and in a period which is evaluated by the monitoring that the influence of fading is small, while the plurality of converted transmission data is selected, the plurality of first addition signals are respectively demodulated by the plurality of demodulation units.

6. The wireless communication method according to claim 5, wherein the monitoring comprises:

performing S/N maximum ratio combining separately to the plurality of reception signals, and monitoring radio propagation status according to plurality of tap information output from the plurality of adaptive matching filters, evaluating that the influence of fading is small when all the plurality of tap information indicates a value greater than or equal to a predetermined threshold, and evaluating that the influence of fading is large when one or more of the plurality of tap information indicates a value less than the threshold.

* * * * *